United States Patent
Ma et al.

(10) Patent No.: US 10,397,348 B2
(45) Date of Patent: Aug. 27, 2019

(54) TECHNIQUES FOR TRACKING RECURRENCE ACROSS COMPUTER SYSTEMS

(71) Applicant: Visa International Service Association, San Francisco, CA (US)

(72) Inventors: Gwen Ma, Foster City, CA (US); Steven Cracknell, San Mateo, CA (US)

(73) Assignee: Visa International Service Association, San Francisco, CA (US)

( * ) Notice: Subject to any disclaimer, the term of this patent is extended or adjusted under 35 U.S.C. 154(b) by 168 days.

(21) Appl. No.: 15/402,013

(22) Filed: Jan. 9, 2017

(65) Prior Publication Data

US 2018/0198876 A1     Jul. 12, 2018

(51) Int. Cl.
   *G06F 15/173*     (2006.01)
   *H04L 29/08*      (2006.01)
   *G06Q 30/02*      (2012.01)

(52) U.S. Cl.
   CPC ............. *H04L 67/22* (2013.01); *G06Q 30/02* (2013.01)

(58) Field of Classification Search
   CPC .............................. H04L 67/22; G06Q 30/02
   See application file for complete search history.

(56) References Cited

U.S. PATENT DOCUMENTS

| | | |
|---|---|---|
| 2011/0238575 A1 | 9/2011 | Nightengale et al. |
| 2012/0179532 A1 | 7/2012 | Vermander |
| 2013/0282461 A1 | 10/2013 | Ovick et al. |
| 2013/0290121 A1 | 10/2013 | Simakov et al. |

FOREIGN PATENT DOCUMENTS

| | | |
|---|---|---|
| KR | 1020080030254 A | 4/2008 |
| KR | 1020150030141 A | 3/2015 |
| WO | 2016097718 A1 | 6/2016 |

OTHER PUBLICATIONS

International Search Report and Written Opinion, dated Apr. 30, 2018, in PCT Application No. PCT/US2018/12572, 13 pages.

*Primary Examiner* — Hua Fan

(74) *Attorney, Agent, or Firm* — Kilpatrick Townsend & Stockton LLP

(57) ABSTRACT

Embodiments of the invention are directed to methods, systems, and devices for tracking recurrence across computer systems. One embodiment of the invention is directed to a method including processing, by a transaction processing computer, a plurality of transactions and then storing, by the transaction processing computer, data relating to the plurality of transactions. The transaction processing computer may be configured to use the data to determine a recurrence value indicating at least a frequency or number of interactions between a resource provider computer and a user, and the transaction processing computer may further initiate an action based on the recurrence value.

15 Claims, 8 Drawing Sheets

| Transaction ID | Account ID | Resource Name | Resource Provider ID | Category Code | Transaction Amount | Transaction Timestamp | Recurrence Count |
|---|---|---|---|---|---|---|---|
| 312WT92... | 13050303... | USER 1 | 12414... | 0780 - Landscaping | $129,081 | 2015-09-30 T 10:45 UTC | 1 |
| AS23636... | 02395902... | USER 2 | 11233... | 3196 - Hawaiian Air | $10,920 | 2016-01-13 T 08:33 UTC | 1 |
| 2353OiER... | 23506023... | USER 3 | 23353... | 3254 - Trump Airline | $1,909,120 | 2016-05-05 T 11:00 UTC | 1 |
| 235ERKTL... | 23506023... | USER 3 | 12424... | 9311 - Tax Payments | $1 | 2016-05-05 T 11:01 UTC | 1 |
| 339494TR... | 02395902... | USER 2 | 37242... | 8062 - Hospitals | $25 | 2016-07-19 T 06:45 UTC | 1 |
| 235235SE... | 23506023... | USER 3 | 99935... | 1520 - General Contractors | $5,994,930 | 2016-08-24 T 22:31 UTC | 2 |
| 8789HJHK... | 23506023... | USER 3 | 99935... | 1520 - General Contractors | $1,924,920 | 2016-08-25 T 21:51 UTC | 2 |
| 9890HOY8... | 21984901... | USER 2 | 37242... | 8062 - Hospitals | $100 | 2016-09-30 T 00:04 UTC | 2 |
| U90UJLJL... | 13050303... | USER 1 | 12414... | 0780 - Landscaping | $1,000 | 2016-12-25 T 07:00 UTC | 2 |
| 90JHKL... | 23506023... | USER 3 | 99935... | 1520 - General Contractors | $910,249 | 2016-12-31 T 23:59 UTC | 3 |
| 235924... | 12401252... | USER 4 | 37242... | 5814 - Fast Food Restaurants | $10 | 2017-01-20 T 06:45 UTC | 1 |

FIG. 5

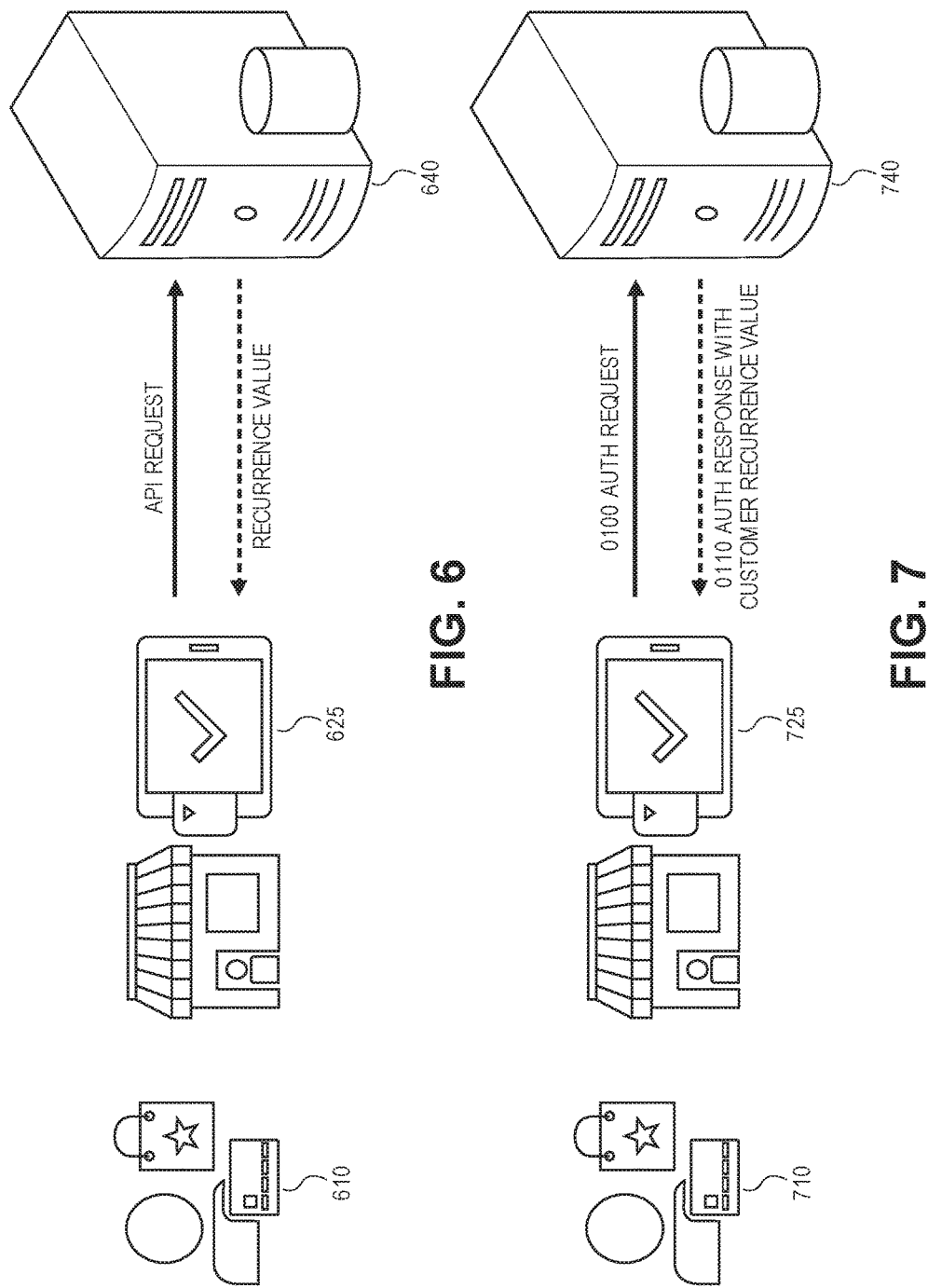

TECHNIQUES FOR TRACKING RECURRENCE ACROSS COMPUTER SYSTEMS

CROSS-REFERENCE TO RELATED APPLICATIONS

None.

BACKGROUND

In today's technological environment, a user may interact with a variety of computer systems to achieve specific tasks or obtain specific resources. For example, on any given day, a user might interact with a first computer system to gain entry into a train terminal, a second computer system to access his or her office building, a third computer system to log onto his or her employer's network, and a fourth computer system to purchase coffee. To interact with each of these computer systems, a user may need to remember specific credentials (e.g. username and password) or carry around entry cards storing credentials (e.g. train pass, credit card, etc.). The credentials are usually required by the various computer systems to authorize access to the user, and are typically managed and stored in a dedicated database specific to the individual computer system for which they were issued. This may make authorization difficult for both users and the resource providers they interact with, as users are required to maintain a multitude of cards and credentials, and resource providers are required to maintain their own dedicated databases for storing user data.

In addition, a resource provider that wishes to track or monitor the behavior of users may need to manage specific accounts, which must be updated in each resource provider's dedicated database each time a new interaction with the user occurs. This can become relatively expensive and inefficient, especially for resource providers that do not have the means to process and store large amounts of user data. For example, a resource provider may be a small family business that wishes to customize the way they interact with specific types of customers. The business may have a device that allows them to electronically interact with customers, but may have no means for electronically recording or tracking the customer's interactions. Often times a resource provider may only have a single location or a single computer system for interacting with users, thus making it impractical for the resource provider to own a dedicated server computer for logging and managing user activity.

Embodiments of the invention address this and other problems, individually and collectively.

BRIEF SUMMARY

Embodiments of the invention are directed to methods, systems, and devices for tracking recurrence across computer systems.

One embodiment of the invention is directed to a method. The method may comprise processing, by a transaction processing computer, a plurality of transactions, wherein each transaction is conducted between a user and a resource provider computer and includes receiving an authorization request message, determining an authorization entity computer associated with the user, transmitting the authorization request message to the authorizing entity computer, receiving an authorization response message from the authorizing entity computer, and transmitting the authorization response message to the resource provider computer. The method may further comprise storing, by the transaction processing computer, data relating to the plurality of transactions; determining, by the transaction processing computer, a recurrence value based on at least the data relating to the plurality of transactions, the recurrence value indicating at least a frequency or number of interactions between the resource provider computer and the user, and initiating, by the transaction processing computer, an action based on the recurrence value.

Another embodiment of the invention is directed to a server computer. The server computer may be a transaction processing computer and may comprise a processor, a network interface, and a non-transitory computer-readable medium. The non-transitory computer-readable medium may be in the form of memory, and may comprise code instructing the processor to implement the above method.

An additional embodiment of the invention is directed to a resource provider computer. The resource provider computer may be configured to implement a method comprising generating, by the resource provider computer, a request message comprising an account identifier, a resource provider identifier of a resource provider, and a request for a recurrence value indicating at least a frequency or number of interactions between a resource provider of the resource provider identifier and a user of the account identifier. The resource provider computer may further be configured to send the request message to a transaction processing computer, receive a response message comprising the recurrence value, and to execute predetermined logic based on the recurrence value.

These and other embodiments of the invention are described in further detail below.

BRIEF DESCRIPTION OF THE DRAWINGS

FIG. 5 shows a depiction of a database according to one embodiment of the invention.

FIG. 6 shows an example of an implementation of recurrence API messages according to an embodiment of the invention.

FIG. 7 shows an example of an implementation of authorization messages according to an embodiment of the invention.

DETAILED DESCRIPTION

Figure 1:
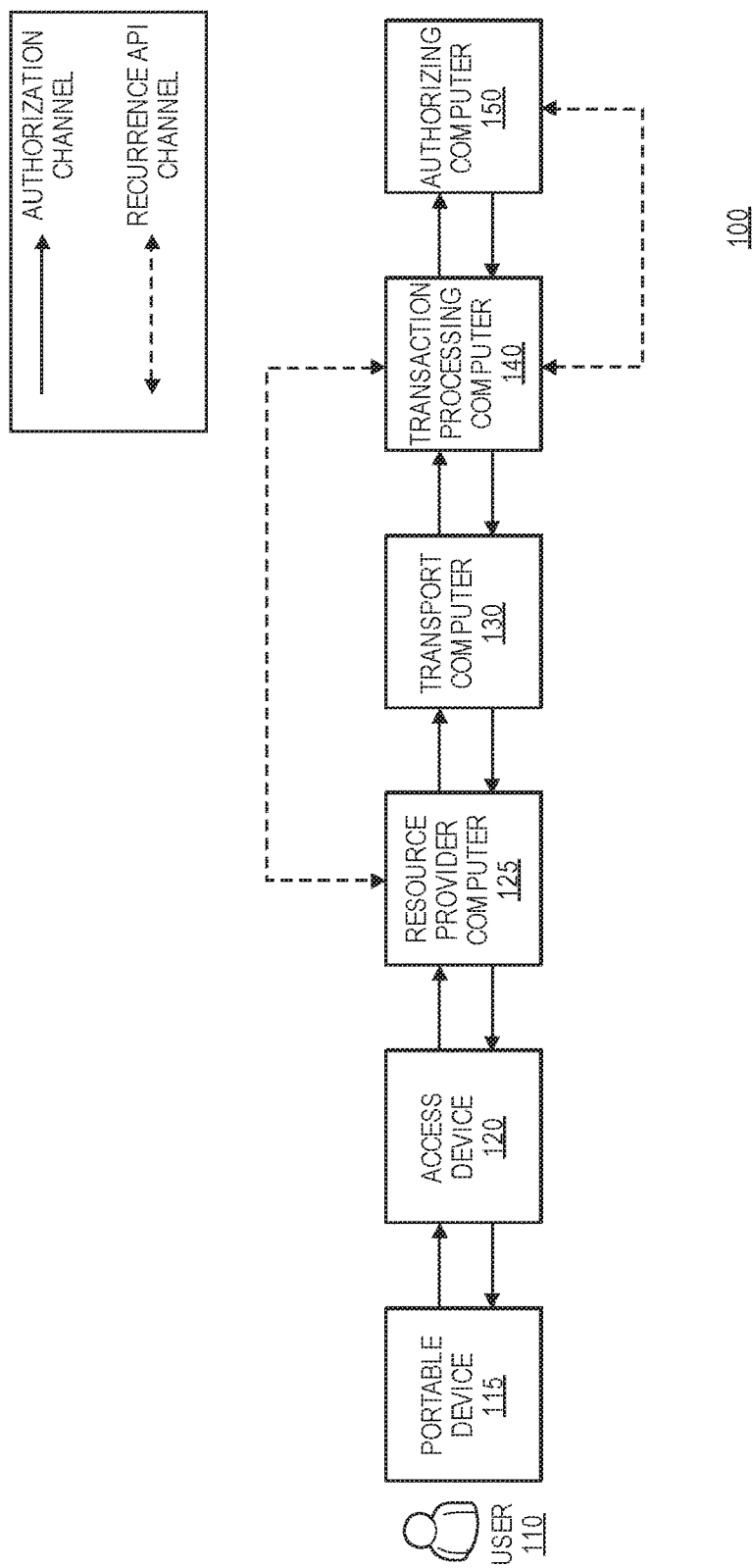
FIG. 1 shows a block diagram of an authorization system according to embodiments of the invention.

Prior to discussing the details of some embodiments of the present invention, description of some terms may be helpful in understanding the various embodiments.

A "user device" may comprise a device that may be used by a user. A user device may comprise of elements such as a display, a processor, a memory, an input device, and a network interface. Examples of a user device may include mobile devices, personal computing devices (e.g. desktop computers, laptop computers, or tablet computers), etc.

A "mobile device" may comprise any electronic device that may be transported and operated by a user, which may also provide remote communication capabilities to a network. Examples of remote communication capabilities include using a mobile phone (wireless) network, wireless data network (e.g., 3G, 4G or similar networks), Wi-Fi, Wi-Max, or any other communication medium that may provide access to a network such as the Internet or a private network. Examples of mobile devices include mobile phones (e.g., cellular phones), PDAs, tablet computers, net books, laptop computers, personal music players, hand-held specialized readers, wearable devices (e.g., watches, glasses, lenses, tattoos, clothing, etc.), vehicles (e.g., cars), etc. A mobile device may comprise any suitable hardware and software for performing such functions, and may also include multiple devices or components (e.g., when a device has remote access to a network by tethering to another device—i.e., using the other device as a relay—both devices taken together may be considered a single mobile device).

A "portable device" may be a device that is portable. A portable device may, for example, be used to conduct a transaction. A portable device may include a storage technology (e.g., electronic memory, magnetic stripe, etc.) to store credentials or tokens associated with an account of a user. A portable device can be in any of the forms described above with respect to the mobile device, or in the form of a card (e.g., integrated chip card, magnetic stripe card) or a fob, etc. In some embodiments, the portable device and the mobile device may be the same device, and need not be separate devices. Specific examples of portable devices can include wearable devices, payment cards such as credit, debit, and prepaid cards, vehicles with remote communication capabilities, etc.

A "server computer" may include a powerful computer or cluster of computers. For example, the server computer can be a large mainframe, a minicomputer cluster, or a group of servers functioning as a unit. In one example, a server computer may be a database server coupled to a Web server. A server computer may comprise one or more computational apparatuses and may use any of a variety of computing structures, arrangements, and compilations for servicing the requests from one or more client computers.

A "processor" may refer to any suitable data computation device or devices. A processor may comprise one or more microprocessors working together to accomplish a desired function. The processor may include CPU comprises at least one high-speed data processor adequate to execute program components for executing user and/or system-generated requests. The CPU may be a microprocessor such as AMD's Athlon, Duron and/or Opteron; IBM and/or Motorola's PowerPC; IBM's and Sony's Cell processor; Intel's Celeron, Itanium, Pentium, Xeon, and/or XScale; and/or the like processor(s).

A "memory" may be any suitable device or devices that can store electronic data. A suitable memory may comprise a non-transitory computer readable medium that stores instructions that can be executed by a processor to implement a desired method. Examples of memories may comprise one or more memory chips, disk drives, etc. Such memories may operate using any suitable electrical, optical, and/or magnetic mode of operation.

An "application" may be computer code or other data stored on a computer readable medium (e.g. memory element or secure element) that may be executable by a processor to complete a task.

A "resource provider" may be an entity that can provide a resource such as goods, services, information, and/or access. Examples of a resource provider includes merchants, data providers such as government agencies, transit agencies, etc. A "merchant" may typically be an entity that engages in transactions and can sell goods or services, or provide access to goods or services.

A "resource provider computer" may be a computer operated by a resource provider. Suitable computers may include access devices, back end server computers, as well as combinations of the above.

An "access device" may be any suitable device for providing access to an external computer system. An access device may be in any suitable form. Some examples of access devices include point of sale (POS) devices, cellular phones, PDAs, personal computers (PCs), tablet PCs, hand-held specialized readers, set-top boxes, electronic cash registers (ECRs), automated teller machines (ATMs), virtual cash registers (VCRs), kiosks, security systems, access systems, Websites, and the like. An access device may use any suitable contact or contactless mode of operation to send or receive data from, or associated with, a portable communication device. In some embodiments, where an access device may comprise a POS terminal, any suitable POS terminal may be used and may include a reader, a processor, and a computer-readable medium. A reader may include any suitable contact or contactless mode of operation. For example, exemplary card readers can include radio frequency (RF) antennas, optical scanners, bar code readers, or magnetic stripe readers to interact with a portable communication device.

An "authorization request message" may be an electronic message that is sent to request authorization for a transaction. The authorization request message can be sent to a payment processing network and/or an issuer of a payment card. An authorization request message according to some embodiments may comply with ISO 8583, which is a standard for systems that exchange electronic transaction information associated with a payment made by a user using a payment device or payment account. Other standard message formats may include ISO 20022 as well as blockchain message format. The authorization request message may include information that can be used to identify an account. An authorization request message may also comprise additional data elements such as one or more of a service code, an expiration date, etc. An authorization request message may also comprise transaction information, such as any information associated with a current transaction, such as the transaction amount, merchant identifier, merchant location, etc., as well as any other information that may be utilized in determining whether to identify and/or authorize a transaction. In addition, an authorization request message may further comprise open data fields, in which additional values may be requested and stored. For example, an authorization request message may comprise a request for a recurrence value indicating at least a frequency or number of interactions between a user and a resource provider computer. The authorization request message may also include other information such as information that identifies the access device that generated the authorization request message, information about the location of the access device, etc.

An "authorization response message" may be an electronic message reply to an authorization request message. The authorization response message can be generated by an issuing financial institution or a payment processing network. The authorization response message may include, by way of example only, one or more of the following status indicators: Approval—transaction was approved; Decline— transaction was not approved; or Call Center—response pending more information, merchant must call the toll-free authorization phone number. The authorization response message may also include an authorization code, which may be a code that a credit card issuing bank returns in response to an authorization request message in an electronic message (either directly or through the payment processing network) to the merchant computer that indicates approval of the transaction. The code may serve as proof of authorization.

An "API message" may be a formatted message that facilitates communications between system components according to an application programming interface or API. The API message may allow system components to share data and initiate actions on each other's behalf. For example, an API message may comprise identifying data that may initiate a server computer to return a value based on the identifying data.

An "application programming interface" or "API" may be a set of routines, protocols, and tools that specify how system components should interact. The API may allow various components of a system to generate, send, and receive to and from each other in a recognizable format. The API may be preconfigured, installed, or programmed onto a device, and may instruct the device to perform specified operations and networking commands. The API may allow for the request of services by initiating calls to specific instructions or code stored in an application.

A "credential" may be any suitable information that serves as reliable evidence of worth, ownership, identity, or authority. A credential may be a string of numbers, letters, or any other suitable characters, as well as any object or document that can serve as confirmation. Examples of credentials include value credentials, identification cards, certified documents, access cards, passcodes and other login information, etc.

A "value credential" may be information associated with worth. Examples of value credentials include payment credentials, coupon identifiers, information needed to obtain a promotional offer, etc.

A "payment credential" may include any suitable credential that can be used to conduct a payment transaction. Such information may be directly related to the account or may be derived from information related to the account. Examples of account information may include a PAN (primary account number or "account number"), user name, expiration date, CWVV (card verification value), dCWVV (dynamic card verification value), CW2 (card verification value 2), CVC3 card verification values, etc.

A "payment device" may include any suitable device that may be used to conduct a financial transaction, such as to provide payment credentials to a merchant. The payment device may be a software object, a hardware object, or a physical object. As examples of physical objects, the payment device may comprise a substrate such as a paper or plastic card, and information that is printed, embossed, encoded, or otherwise included at or near a surface of an object. A hardware object can relate to circuitry (e.g., permanent voltage values), and a software object can relate to non-permanent data stored on a device. A payment device may be associated with a value such as a monetary value, a discount, or store credit, and a payment device may be associated with an entity such as a bank, a merchant, a payment processing network, or a person. A payment device may be used to make a payment transaction. Suitable payment devices can be hand-held and compact so that they can fit into a user's wallet and/or pocket (e.g., pocket-sized). Example payment devices may include smart cards, magnetic stripe cards, keychain devices (such as the Speedpass™ commercially available from Exxon-Mobil Corp.), etc.

A "token" may be a substitute value for a credential. A token may be a string of numbers, letters, or any other suitable characters. Examples of tokens include payment tokens, access tokens, personal identification tokens, etc.

A "payment token" may include an identifier for a payment account that is a substitute for an account identifier, such as a primary account number (PAN) and/or an expiration date. For example, a token may include a series of alphanumeric characters that may be used as a substitute for an original account identifier. For example, a token "4900 0000 0000 0001" may be used in place of a PAN "4147 0900 0000 1234." In some embodiments, a token may be "format preserving" and may have a numeric format that conforms to the account identifiers used in existing transaction processing networks (e.g., ISO 8583 financial transaction message format). In some embodiments, a token may be used in place of a PAN to initiate, authorize, settle or resolve a payment transaction or represent the original credential in other systems where the original credential would typically be provided. In some embodiments, a token value may be generated such that the recovery of the original PAN or other account identifier from the token value may not be computationally derived. Further, in some embodiments, the token format may be configured to allow the entity receiving the token to identify it as a token and recognize the entity that issued the token.

"Tokenization" is a process by which data is replaced with substitute data. For example, a payment account identifier (e.g., a primary account number (PAN)) may be tokenized by replacing the primary account identifier with a substitute number (e.g. a token) that may be associated with the payment account identifier.

An "account identifier" may include any suitable label for an account. The account identifier may be in any suitable form and may include any suitable types of characters. Examples of account identifiers include PANs (primary account numbers), tokens, verification values such as CWs, etc.

An "acquirer" may typically be a business entity (e.g., a commercial bank) that has a business relationship with a particular merchant or other entity. Some entities can perform both issuer and acquirer functions. Some embodiments may encompass such single entity issuer-acquirers. An acquirer may operate an acquirer computer, which can also be generically referred to as a "transport computer".

An "authorizing entity" may be an entity that authorizes a request. Examples of an authorizing entity may be an issuer, a governmental agency, a document repository, an access administrator, etc. An authorizing entity may operate an authorization computer. An "issuer" may refer to a business entity (e.g., a bank) that issues and optionally maintains an account for a user. An issuer may also issue payment credentials stored on a user device, such as a cellular telephone, smart card, tablet, or laptop to the consumer.

An "account identifier" may include an identifier for an account. An account identifier may include an original account identifier associated with a payment account. For example, a real account identifier may be a primary account number (PAN) issued by an issuer for a card account (e.g., credit card, debit card, etc.) or a token. For instance, in some embodiments, a real account identifier may include a sixteen digit numerical value such as "4147 0900 0000 1234." The first six digits of the real account identifier (e.g., "414709"), may represent a real issuer identifier (BIN) that may identify an issuer associated with the real account identifier.

A "resource provider identifier" can include any suitable type of information that can identify a resource provider or a location of a resource provider. Examples of resource provider identifiers may include a merchant ID, a store ID, a device ID of a device at a resource provider location, etc.

FIG. 1 shows a block diagram of an authorization system according to embodiments of the invention. System 100 may comprise access device 120 for interacting with portable device 115. Portable device 115 may be any device used to store credentials of user 110 such as a portable access card, payment card, RFID tag, or any portable device capable of storing data such as a mobile phone, PDA, tablet, wearable electronic device, etc. Access device 120 may transmit and receive data to and from portable device 115 using any number of communication methods supported by access device 120 and portable device 115 such as near-field communications, magnetic-stripe, Bluetooth, electrical contact, internet protocol, etc.

Access device 120 may be a device that is coupled to resource provider computer 125 in this example. In other examples, the access device 120 may be a resource provider computer, or the access device 120 in combination with the resource provider computer 125 may constitute a "resource provider computer." Resource provider computer 125 may be configured to generate, send, and receive authorization messages based on interactions with user 110. System 100 may further comprise transport computer 130 configured to receive and forward authorization messages, transaction processing computer 140 configured to process transaction data, and authorizing computer 150 configured to determine authorization decisions or authorization results.

During a transaction, user 110 may present portable device 115 to a resource provider. The transaction may be a purchase of goods or services, a request to access a building, an inquiry for sensitive information, etc. In order to conduct the transaction, the resource provider may ask user 110 to transmit his or her stored credentials to access device 120. For example, the resource provider may be a merchant that asks user 110 to insert his or her payment card into a smart card reader of access device 120. The credentials of user 110 may be stored on portable device 115 in the form of an account identifier that identifies an account of the user. One example of an account identifier may be a primary account number (PAN). According to embodiments of the invention, portable device 115 may transmit credentials instantly to access device 120 after establishing a connection has been established or after confirmation of authenticating data such as a PIN, password, biometric, etc. Access device 120 may receive the credentials from portable device 115 and may transmit the credentials to resource provider computer 125. Resource provider may use the received credentials to generate a message requesting information relating to user 110.

In one embodiment, resource provider computer 125 may use the received credentials to generate an authorization request message. The authorization request message may comprise the credentials or account identifier of user 110 and a resource provider identifier identifying the resource provider or resource provider computer. For example, the resource provider identifier may be a merchant ID identifying computers and systems of a merchant that conducts transactions with users. In addition, the authorization request message may contain a recurrence request, requesting a recurrence value. The recurrence value may be an indication of the frequency or number of times at which user 110 interacts or conducts transactions with a resource provider or with a specific computer system. For example, the authorization request message may contain a request by resource provider computer 125 for information on how many times user 110 has interacted with the resource provider computer in the last month. In other embodiments, the request may be for how many times the user 110 has ever interacted with the resource provider. In some embodiments, the recurrence request may be communicated or indicated by resource provider computer 125 by changing the value of an allocated bit or data field in the authorization request message. For example, the authorization request message may comprise a bit that may be changed from '0' to '1,' thereby indicating that a recurrence value is requested.

Once the authorization request message has been generated, resource provider computer 125 may send the message to transport computer 130. Transport computer 130 may be any computer for receiving and forwarding authorization messages according to embodiments of the invention. In one embodiment, transport computer 130 may be a computer of an acquiring entity that enables a resource provider to conduct specific types of transactions.

Transport computer 130 may receive the authorization request message from resource provider computer 125 and may forward the message to transaction processing computer 140. Transaction processing computer 140 may be any computer or server computer for processing transactions according to embodiments of the invention. For example, transaction processing computer 140 may be a computer of a payment processing network, such as VisaNet, and may be configured to receive, read, analyze, store, and retrieve transaction data as well as determine appropriate actions based on predetermined logic. In one embodiment, transaction processing computer 140 may read values stored in one or more bit fields or data fields of the received authorization request message and may determine, from the read values, that the resource provider has requested information relating to a frequency or number of interactions. For example, an allocated bit may be set to '1' or 'true,' indicating that resource provider computer 125 has requested a recurrence value indicating at least a frequency or number of interactions between resource provider computer 125 and the user 110.

According to embodiments of the invention, transaction processing computer 140 may determine, based on the data in the authorization request message, an authorizing entity computer or authorizing computer 150 associated with user 110. For example, transaction processing computer 140 may read the account identifier and may determine that the first six digits of the account identifier comprises an issuer identification number (IIN) specifying an authorizing system associated with user 110 or user 110's credentials. In one embodiment, authorizing computer 150 may be a computer of an issuing entity that issues credentials and/or portable device 115 to user 110 such as a bank, government agency, security network, etc. Upon determination of the authorizing entity computer, transaction processing computer may determine an address of authorizing computer 150, so that the authorization request message can be routed to authorizing computer 150 for authorization of the transaction.

Transaction processing computer 140 may send the authorization request message to authorizing computer 150, and authorizing computer 150 may receive the authorization request message to determine an authorization result based on the data contained therein. For example, the data may comprise an account identifier or PAN that is associated with an availability of funds or credit that may be compared to a transaction amount. Authorizing computer 150 may evaluate the received data and determine an authorization result of "approve" or "decline." The authorization result may be used to generate an authorization response message that may be sent back to transaction processing computer 140. Transaction processing computer 140 may receive the authorization response message and may send the message to transport computer 130. Transport computer 130 may then forward the authorization response message to resource provider computer 125 so that the resource provider may determine an action based on the authorization result contained therein.

According to one embodiment, transaction processing computer 140 may be configured to indicate a recurrence response that may initiate an action based on a determined recurrence value. This may be done, by transaction processing computer 140, by adjusting a value of an allocated data field in an authorization response message and sending the authorization response message to resource provider computer 125. The recurrence value may be determined based on a record of previous transactions conducted with a specific account identifier at a specific resource provider associated with a specific resource provider identifier. In one embodiment, transaction processing computer 140 may query a transaction database for transactions linked to both the account identifier and resource provider identifier received in authorization messages and may identify the transactions as being recurring transactions between user 110 and the resource provider. Transaction processing computer 140 may then determine the frequency at which the identified transactions occurred over a predetermined period of time. For example, transaction processing computer 140 may determine the total amount of recurring transactions and calculate the average number of recurring transactions per week. As an illustration, transaction processing computer 140 may determine that six recurring transactions were conducted over the course of two weeks and that the average number of recurring transactions per week is equal to '3.' Transaction processing computer 140 may then alter a corresponding data field allocated for a recurrence value to indicate that the recurrence value is equal to '3.'

In another embodiment, transaction processing computer 140 may indicate the recurrence response in the authorization request message prior to sending the message to an authorizing computer 150. The recurrence response may initiate a change in the authorization request message, thereby potentially influencing the authorization result determined by authorizing computer 150. For example, a high recurrence value may indicate that the transaction is less likely to be fraudulent, since the same account identifier is used, and should be approved by the authorizing computer 150. In another example, transaction processing server computer may receive a recurrence request in an authorization request message and determine a recurrence response value of '0' for the transaction. Transaction processing server computer 140 may determine that for transactions in which the recurrence response value is equal to '0,' it is signified that user 110 is a non-recurring or first time user and the transaction amount should be reduced by $5. By doing so, the first time user may be incentivized to conduct business with the resource provider in the future. The transaction processing computer 140 may then reduce the transaction amount in the authorization request message from $50 to $45. Transaction processing computer 140 may send the modified authorization request message to authorizing computer 150, and authorizing computer 150 may determine an authorization result based on a transaction amount of $45. Authorizing computer 150 may then send the authorization result to transaction processing computer 150 in an authorization response message, which may be forwarded to the resource provider computer 125.

In yet another embodiment, transaction processing computer 140 may receive and transmit recurrence requests and recurrence responses using messages sent and received outside of the authorization channel (i.e. independent of the transmission of authorization request messages and authorization response messages). In some embodiments, transaction processing computer may directly send separate recurrence API request and recurrence API response messages to and from resource provider computer 125 and authorizing computer 150. According to embodiments of the invention, a recurrence API request message may comprise an account identifier of user 110 and a resource provider identifier of a resource provider.

A recurrence API response message may comprise a discrete value associated with a specific recurrence value or a specific range of recurrence values determined from the account identifier and resource provider identifier. For example, a recurrence API response message may contain one or more predetermined values or recurrence values indicating any one of the following: "first time match—credentials have not been used at provider system in past X months," "frequent occurrence—credentials have been used at provider system at least one or two times a week," or "infrequent occurrence—credentials have been used at provider system once in the last month."

In one embodiment, transaction processing computer 140 may further comprise logic for initiating an action based on a determined recurrence value. According to one embodiment, the logic may be stored in a recurrence logic database, in which discrete recurrence values are each linked to various logic for initiating actions. Transaction processing computer 140 may query the recurrence logic database for a received recurrence value, and may execute associated logic that initiates an action. For example, a received recurrence value may be equal to '0' and may indicate "first time match—credentials have not been used at provider system in past 6 months," and transaction processing computer 140 may then execute corresponding logic to reduce the transaction amount by $5.

In another embodiment, resource provider computer 125 may receive a recurrence value in an authorization response message or recurrence API response message, and may execute logic based on the received recurrence value. Resource provider computer 125 may comprise instructions for receiving a recurrence value and querying a database for response logic linked to the received recurrence value. For example, resource provider computer 125 may receive a recurrence value indicating 'frequent occurrence—credentials have been used at provider system at least two times a week' and may query a relational database for the indicated recurrence value. Resource provider computer 125 may determine that the indicated recurrence value is linked to logic that instructs resource provider computer 125 or access device 120 to print a coupon that user 101 may use in a later transaction. Resource provider computer 125 may execute the stored logic, and the action may be executed (i.e. printing of the coupon) as a response to the determined recurrence of interactions between user 101 and the resource provider's computer system.

In yet another embodiment, transaction processing computer 140 may determine a recurrence value and may be configured to send a separate request to authorizing computer 150 after authorization has occurred. The request may be a request to initiate a specific predetermined action based on the recurrence value. For example, transaction processing computer 140 may be configured to send a request for a statement credit of $5 to authorizing computer 150 upon determination of a recurrence value of 'frequent occurrence—credentials have been used at provider system at least two times a week.' Transaction processing computer 140 may send the request for the statement credit to authorizing computer 150, and authorizing computer 150 may update an account of user 110 to reflect that a $5 credit has been issued as a result of interactions between user 110 and a resource provider.

At the end of the day or at some other period of time after the entities of system 110 have responded and taken appropriate action based on the authorization result and/or determined recurrence value, a clearing and settlement process can take place and the interaction may be officially recorded. For example, after predetermined logic has been executed by transaction processing computer 140 or by resource provider computer 125, an allocation of funds may be facilitated between an issuer of authorizing computer 150, a payment processing network of transaction processing computer 140, an acquirer of transport computer 130, and a resource provider of resource provider computer 125. The allocation of funds may be accounted for by storing data relating to the interaction or transaction in one or more secure databases.

Figure 2:
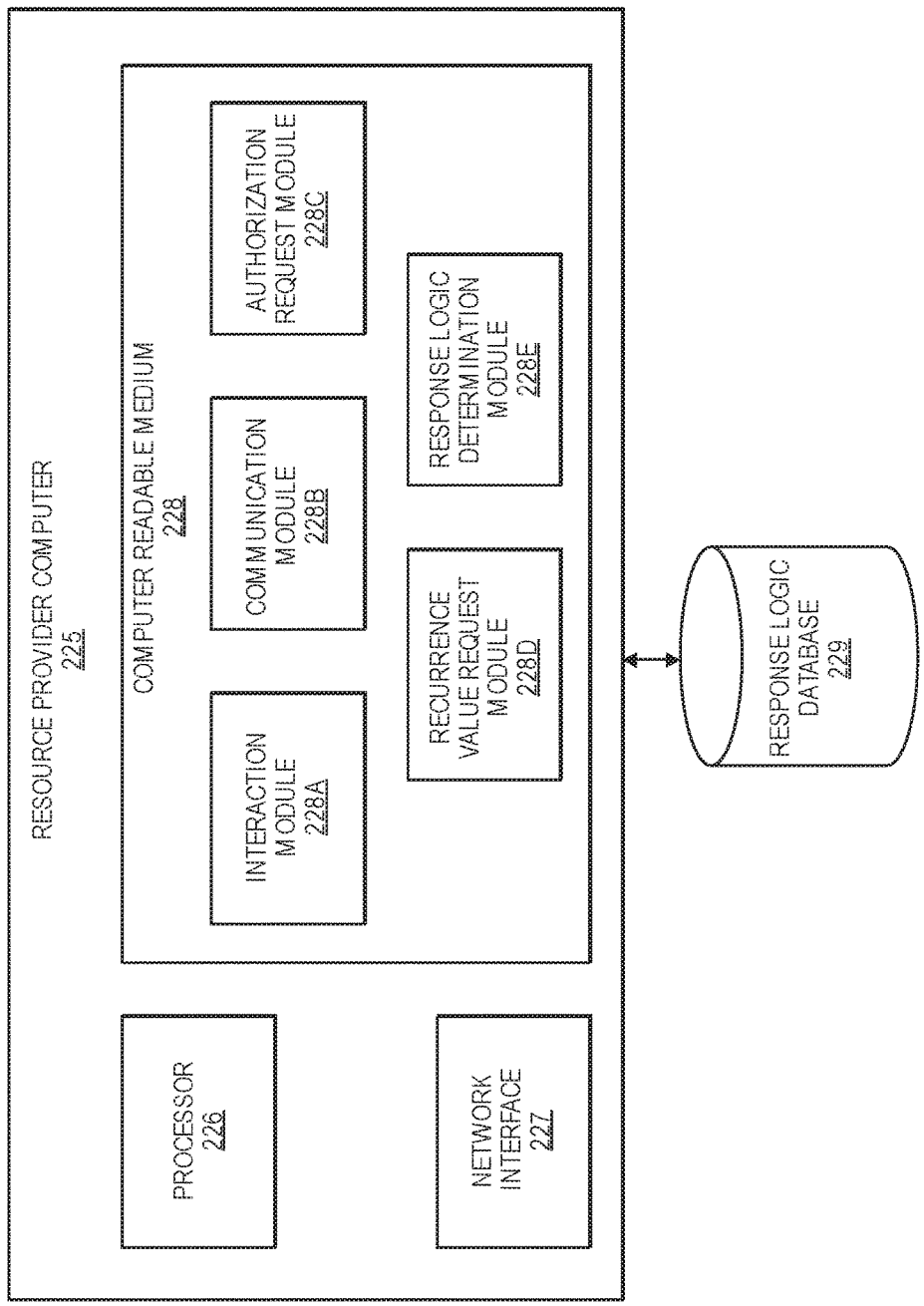
FIG. 2 shows a block diagram of a resource provider computer according to an embodiment of the invention.

FIG. 2 shows a block diagram of a resource provider computer according to an embodiment of the invention. Resource provider computer 225 may be any computer, device, or server computer configured to conduct transactions between a resource provider and a user, such as resource provider computer 125 of FIG. 1. Resource provider 225 may comprise a processor 226 for executing instructions or logic, a network interface 227 for sending and receiving messages over a network, and computer readable medium 228 for storing instructions or modules that may be executed by processor 226 to perform tasks and methods according to embodiments of the invention. The instructions or modules may be in the form of code stored in an application or of an application programming interface (API).

Computer readable medium 228 may comprise interaction module 228A for instructing processor 226 to generate interaction data or transaction data comprising information about an interaction (e.g. transaction amount, product data, etc.). In one embodiment, the transaction data may also comprise a transaction timestamp specifying the time and date of the transaction, as well as a transaction ID which may be recorded and later be used to identify the transaction that takes place. Computer readable medium 228 may further comprise communication module 228 for instructing processor 226 to receive, format, and transmit data and/or messages over network interface 227 during a transaction. For example, communication module 228 may comprise code for formatting and sending an authorization request message and for receiving and reformatting an authorization response message.

Computer readable medium 228 may comprise authorization request module 228C for generating an authorization request message according to embodiments of the invention. The authorization request message may comprise the transaction data, an account identifier of a user, and a resource provider identifier of a resource provider. The resource provider identifier may be a merchant ID identifying the resource provider or resource provider computer that generated the authorization request message and may also be associated with a resource provider category or merchant category code. A category code may be a code designated to specific resource provider computer systems that share similar characteristics. For example, a merchant category code (MCC) may be equal to '4112,' which may indicate that resource provider computer 225 belongs to a category of computer systems that share the characteristics of, or have been designated as, 'passenger railways.'

Computer readable medium 228 may comprise recurrence value request module 228D for indicating a request for a recurrence value in an authorization request message or recurrence API request message. For example, recurrence value request module 228D may comprise code for modifying an allocated bit or data field in an authorization request message, or may comprise code for generating a recurrence API request message comprising an account identifier of a user and a resource provider identifier of a resource provider.

Computer readable medium 228 may further comprise response logic determination module 228E for determining logic to execute based on a received recurrence value or response. Response logic may be predetermined and stored on or managed by resource provider computer 225. For example, resource provider computer 225 may be configured with an application program interface (API) comprising instructions that executes response logic upon receiving a determined recurrence value.

Response logic may be stored in a memory of resource provider computer such as random-access memory (RAM) or application memory or may be stored in an external memory or separate database such as response logic database 229. Response logic database 229 may be a relational database that links discrete recurrence values to predetermined logic or predetermined actions. In some embodiments, resource provider computer 225 may receive a recurrence value in a message received from a transaction processing computer, and may then execute the predetermined logic or action accordingly. For example, resource provider computer 225 may receive a recurrence value of 'infrequent occurrence—credentials have been used at provider system once in the last month' in a recurrence API response message. The recurrence value may be linked to logic instructing resource provider computer 225 to reduce the transaction amount by 10% before requesting authorization. In another example, resource provider computer 225 may be a merchant computer that is configured to receive a recurrence response and, based on the indicated recurrence value contained therein, display a message instructing or informing a merchant employee to initiate a custom interaction with user 110 (e.g. 'user is first time customer—provide gift to user'). In yet another example, resource provider computer 225 may be an access computer that is configured to lock access (e.g., physical or virtual) to the user for 24 hours if the recurrence value is above a predetermined threshold (e.g. 'recurrence value >3—user has exceeded daily usage limit).

Response logic that is stored or accessible by resource provider computer 225 may comprise any set of logical statements which define one or more actions to execute based on a received recurrence value. The logical statements may be defined for recurrence values indicating a frequency or number of interactions between a user and resource provider computer 225 or between the user and one or more disparate resource provider computer systems configured according to system 100 of FIG. 1. For example, resource provider computer 225 may generate a recurrence API request message requesting a frequency of interactions between user 101 of FIG. 1 and all resource provider computer systems designated as '4112—Passenger Railways.' A transaction processing computer, such transaction processing computer 140 of FIG. 1, may receive the recurrence API request message and may query a database for transactions associated with the account identifier of user 101 and of resource provider identifiers associated with the category '4112—Passenger Railways.' The recurrence value may be determined by the transaction processing computer to be 'frequent occurrence—credentials have been used at provider system at least two times a week.' Resource provider computer 225 may then receive the recurrence value from the transaction processing computer in a recurrence API response message, and the associated logical statement may instruct resource provider computer 225 to print a transportation pass that may be used by user 101 to access a passenger railway terminal. Any number of logical statements may be predetermined and/or programmed onto resource provider computer 225, which may be used to customize interactions with a user based on the user's interaction behavior and/or transaction frequency.

Figure 3:
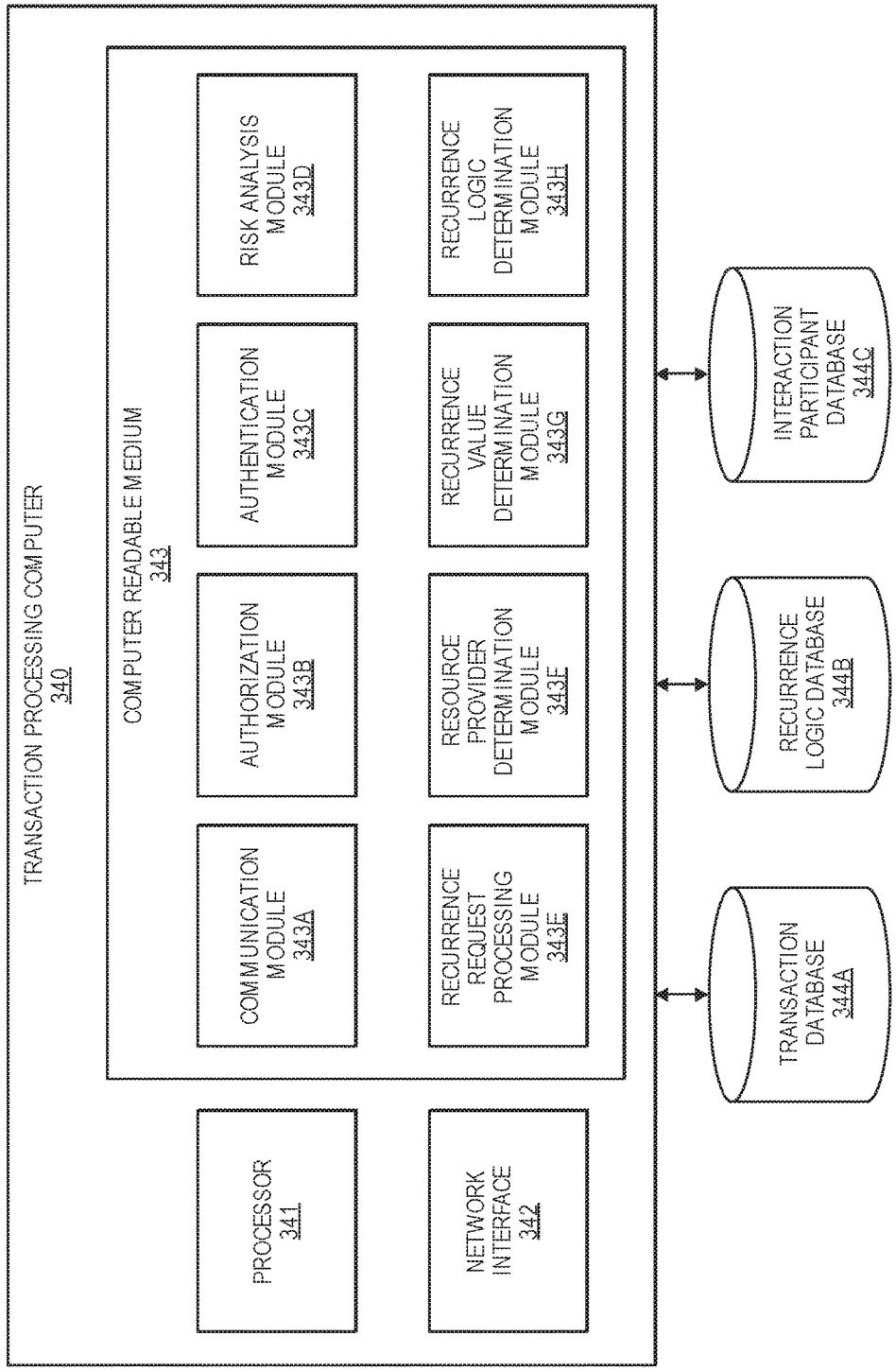
FIG. 3 shows a block diagram of a transaction processing computer according to an embodiment of the invention.

FIG. 3 shows a block diagram of a transaction processing computer according to an embodiment of the invention. Transaction processing computer 340 may be any processing computer or server computer configured to process data received in a transaction such as transaction processing computer 140 of FIG. 1. Transaction processing computer 340 may comprise a processor 341 for executing instructions or logic, a network interface 342 for sending and receiving messages over a network, and computer readable medium 343 for storing modules or code that may be used to initiate or perform tasks upon execution by processor 341.

Transaction processing computer 340 may further be coupled to transaction database 344A for storing and linking transaction data. The transaction data may comprise data pertaining to previous transactions such as a transaction ID, account identifier, resource provider identifier, resource provider category code, etc. Transaction processing computer 340 may further be coupled to recurrence logic database 344B for storing and linking logic that is executed given a specific recurrence value or according to a specific range of recurrence values. Transaction processing computer 340 may be additionally coupled to interaction participant database 344C for storing and linking data relating to interacting users and resource providers such as associated account identifiers of a user and associated resource provider identifiers of a resource provider. In one embodiment, transaction database 344A, recurrence logic database 344B, and interaction participant database 344C may comprise dedicated entries of a single database managed by transaction processing computer 340.

Computer readable medium 343 may comprise communication module 343A for instructing processor 341 to receive, format, and transmit data and/or messages according to embodiments of the invention. For example, communication module 343A may comprise code instructing transaction processing computer 340 to receive and reformat authorization messages that are communicatively exchanged through network interface 342. Computer readable medium 343 may further comprise authorization module 343B for processing authorization request messages and authorization response messages.

Authorization module 343B may comprise code instructing transaction processing computer 340 to read data fields contained in an authorization request message and determine a corresponding action. In one embodiment, authorization module 343B may comprise code instructing transaction processing computer 340 to authorize a transaction on behalf of an authorizing entity and according to predetermined preferences of the authorizing entity. Authorization module 343B may further comprise code for identifying an authorizing computer based on at least a portion of an account identifier. For example, an account identifier may be a 16-digit primary account number (PAN) and transaction processing computer 340 may determine that the first 6 digits identifies a specific issuer or authorizing entity such as '469216—JP Morgan Chase.'

Computer readable medium 343 may comprise authentication module 343C for instructing processor 341 to authenticate a user or the credentials received in a transaction. For example, authentication module 343C may comprise code instructing transaction processing computer 340 to query the user for authentication credentials or to validate the credentials received in the transaction. Authentication module 343C may further comprise code instructing processor 341 to compare the received credentials to a list of fraudulently used credentials and determine, based on the comparison, if the credentials are invalid.

Computer readable medium 343 may further comprise risk analysis module 343D for instructing processor 341 to assess the risk of a pending transaction and to generate a risk score based on predetermined rules and criteria. For example, risk analysis module 343D may comprise code that generate a risk score ranging from '0' to '100' by evaluating such factors as transaction amount, associated riskiness of resource provider identifier, associated riskiness of account identifier, time of day that transaction occurs, location of transaction, frequency of transactions within a selected time period, etc. The risk score may be included in an authorization request message in order to affect an authorization result determined by an authorizing entity or may be used to reject or authorize a transaction depending on predetermined preferences of the authorizing entity.

Computer readable medium 343 may comprise recurrence request processing module 343E for instructing processor 341 to receive and process recurrence requests that may be contained in an authorization request message and/or recurrence API request message. For example, recurrence request processing module may comprise code instructing transaction processing computer 340 to read one or more allocated bit fields or data fields indicating that a recurrence value for a given user and resource provider has been requested. Computer readable medium 343 may further comprise resource provider determination module 343F for determining the resource provider for which the recurrence value is requested, as well as for determining any other data relating to the resource provider such as location and/or resource provider category code.

Computer readable medium 343 may comprise recurrence value determination module 343G for instructing processor 341 to determine or calculate a recurrence value by comparing data received in a recurrence request with data stored in transaction database 344A. For example, recurrence value determination module 343G may comprise code instructing transaction processing computer 340 to query transaction database 344A for all transactions within the last 6 months that are linked to both an account identifier of '0123 2421 1240 1240' as well as a resource provider identifier of '3245 . . . Gwen's Sandwiches' and may determine that there are over 50 transactions within the last 6 months that meet this criteria. The code may then further instruct transaction processing computer 340 to indicate the recurrence value in a recurrence response by adjusting an allocated bit corresponding to a recurrence value of 'frequent occurrence—credentials have been used at provider system multiple times within the last 6 months'. The recurrence value may be determined from any number of predetermined rules defining the frequency or recurrence of interactions between a user and a resource provider system. For example, a recurrence value may be a numerical value ranging from '0' to '100' that specifies the exact total or average number of transactions within a given time period such as '5 transactions per week,' '1 transaction per month,' '0 transactions per year,' etc. In another example, a recurrence value may be a discrete value that is determined from a predefined range of interaction frequencies such as 'set bit 1=1: cardholder/merchant ID is a first time match (0 to 1 interactions)' 'set bit 2=1: cardholder/merchant ID match occurs frequently (10 or more interactions),' or 'set bit 3=1: cardholder/merchant ID match occurs infrequently (between 2 and 10 interactions).'

According to one embodiment, recurrence values may be determined or calculated for a resource provider associated with multiple locations, computer systems, and/or resource provider identifiers by querying interaction participant database 344C for all resource provider identifiers associated with the resource provider. Transaction processing computer 340 may then determine a recurrence value that takes into consideration all transactions linked to any one of the resource provider identifiers. Similarly, a recurrence value may be determined or calculated for a specific user in possession of multiple accounts by querying interaction participant database 344C for all account identifiers associated with the user. Transaction processing computer 340 may then determine a recurrence value that takes into consideration all transactions linked to any one of the account identifiers associated with the user. Recurrence values determined by transaction processing computer 340 may further be constrained by other predefined criteria that may be included in recurrence value determination module 343G. For example, recurrence value determination module 343G may comprise predefined criteria specifying that specific cards or product IDs should be excluded from a recurrence value calculation such as, 'exclude account identifiers starting with 1234 5 . . . : Product ID=gift card.'

Computer readable medium 343 may comprise recurrence logic determination module 343H for instructing processor 341 to determine and initiate an action based on a determined recurrence value. For example, transaction processing computer 340 may determine a recurrence value of '0—first time user,' and may query recurrence logic database 344B for an action or logic linked to the determined recurrence value. Transaction processing computer 340 may then retrieve and execute the logic, which may initiate processor 341 to reduce the transaction amount by $5 before submitting the transaction for authorization. In another example, the retrieved and executed logic may cause transaction processing computer to send the determined recurrence value to a specified resource provider computer so that the specified resource provider computer may determine and execute its own action based on the recurrence value.

Figure 4:
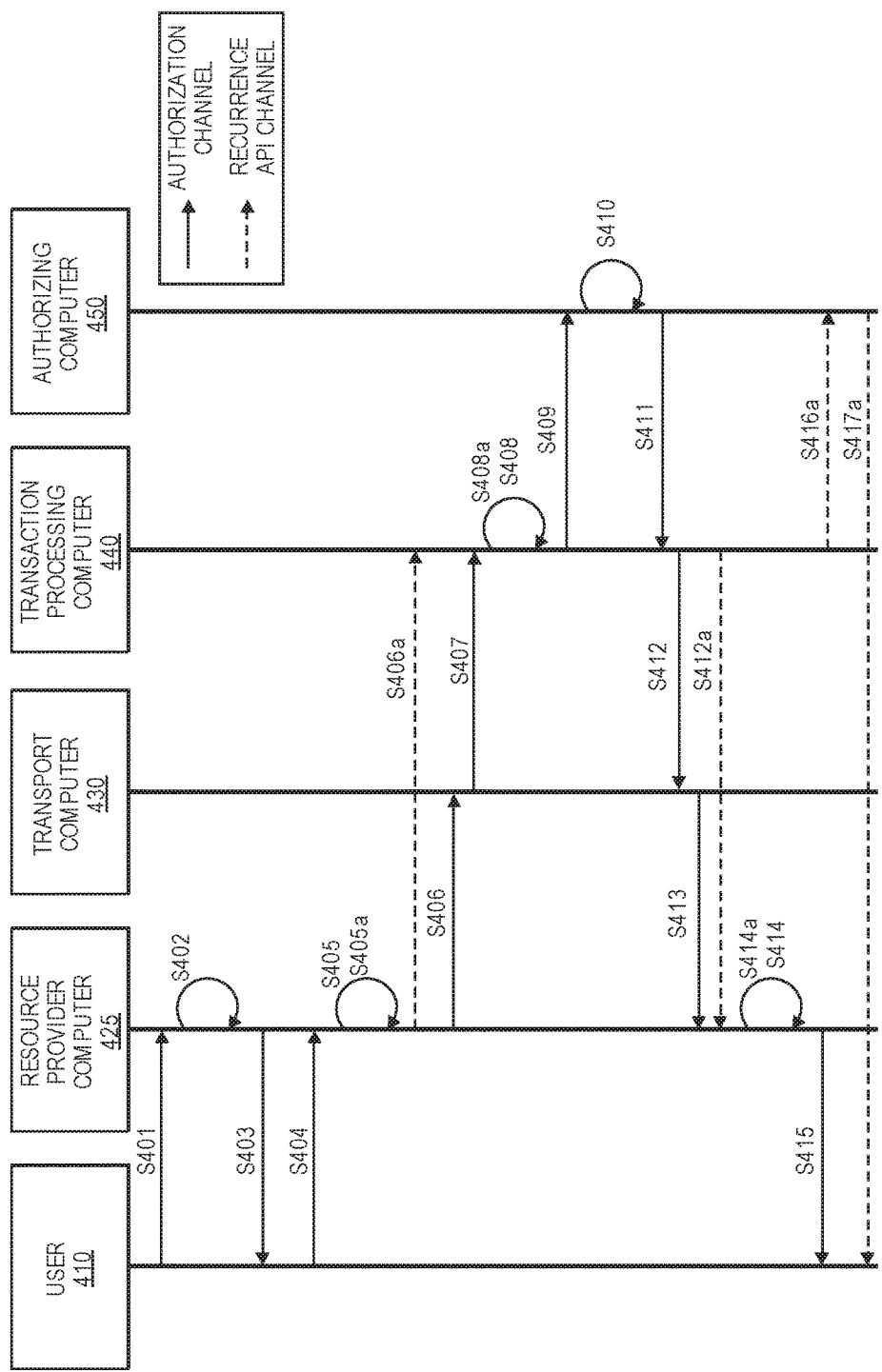
FIG. 4 shows a swim-lane diagram of a transaction flow according to an embodiment of the invention.

FIG. 4 shows a swim-lane diagram of a transaction flow according to an embodiment of the invention. Process 400 may be cooperatively executed by user 410, resource provider computer 425, transport computer 430, transaction processing computer 440, and authorizing computer 450, which may be the same as the corresponding entities of system 100 of FIG. 1. Resource provider computer 425 may be the combination of the access device 120 and the resource provider computer 125 in FIG. 1. To conduct a transaction, according to embodiments of the invention, user 410 first informs or makes a request to resource provider computer 425 as to the resources he or she wishes to gain access to in S401. For example, user 410 may select a number of items for purchase and may inform the resource provider that he or she is ready to "checkout" by selecting a checkout icon on a merchant website or by physically presenting the items to an employee operating the resource provider computer. In another example, the transaction may be a request for access to a specific floor of a building, and user 401 may inform resource provider computer 425 of the floor he or she wishes to access by pressing a button or making a selection on a graphical interface (e.g. user selects floor 18).

In S402, resource provider computer 425 may receive the request from the user and may generate transaction data to confirm with user 410. For example, resource provider computer 425 may determine a transaction amount that may be shown on a display for the user to confirm. In S403, resource provider computer 425 may communicate the transaction data to user 410 and prompt user 410 to present his or her credentials. In S404, user 410 may transmit his or her credentials or account identifier to resource provider computer 425. For example, user 410 may possess a portable device or portable access card storing credentials and may transmit the credentials via near-field communications from the portable access card to resource provider computer 425. In another example, user 410 may transmit an account identifier, such as a 16-digit primary account number (PAN), by inserting his or her portable device into a card reader of resource provider computer 425.

In S405, resource provider computer 425 may receive user 410's credentials or account identifier and generate an authorization request message comprising the transaction data, account identifier, and a resource provider identifier of a resource provider (e.g. resource provider identifier of resource provider computer 425). In one embodiment, the authorization request message may further comprise an indication of a recurrence request. The recurrence request may be indicated by changing the value of an allocated bit or data field, which may be read by a transaction processing computer and prompt the transaction processing computer to determine a recurrence value. In another embodiment, the recurrence request may be indicated in a recurrence API request message in S405a. The recurrence API request message may be a separate data message outside of the authorization channel that is generated by resource provider computer 425. The recurrence API request message may comprise the account identifier of user 410 and the resource provider identifier of resource provider computer 425. The recurrence API request message may be sent from resource provider computer 425 to transaction processing computer 440, which may receive the recurrence API request message and determine a recurrence value or frequency of interactions between user 410 and the resource provider system.

In S406, the resource provider computer 425 may send the authorization request message to transport computer 430. Transport computer 430 may then forward the authorization request message to transaction processing computer 440 in S407. Transaction processing computer 440 may receive the authorization request message and may determine a set of appropriate actions in S408, based on the data contained therein. For example, transaction processing computer 440 may determine a recurrence value based on the account identifier and resource provider identifier and may execute corresponding logic such as reducing the transaction amount. The corresponding logic may be determined by, for example, querying a relational database in which predetermined logic is linked to discrete recurrence values or range of recurrence values. In another example, transaction processing computer 440 may determine a recurrence value and may indicate the determined recurrence value in an allocated data field of the authorization request message so that another computer or entity may determine an appropriate action based on the value. Transaction processing computer 440 may also determine an authorizing computer from the data in the authorization request message. For example, transaction processing computer 440 may read the account identifier and determine that the received credentials or account identifier comprises an issuer identification number (IIN) identifying an authorizing or issuer computer that is associated with user 410's credentials.

In another embodiment, transaction processing computer 440 may receive the recurrence API request message that was generated in S405*a* and transmitted in S406*a* and may determine a recurrence value in S408*a*, based on the data contained therein. Transaction processing computer 440 may determine a recurrence value based on the account identifier and resource provider identifier and may indicate the determined recurrence value in a recurrence API response message. Transaction processing computer 440 may determine the recurrence value by, for example, querying a database for transactions linked to both the account identifier and resource provider identifier and calculating the frequency at which the transactions occur over a predetermined period of time (e.g. 5 times in the last week).

In S409, transaction processing computer 440 may modify the authorization request message and send the authorization request message to authorizing computer 450. Authorizing computer 450 may receive the authorization request message and determine an authorization result in S410. Authorizing computer 450 may determine the authorization result by, for example, comparing the transaction amount to data relating to the account identifier such as remaining balance of the user's account. Authorizing computer 450 may determine the authorization result based on any number of predetermined criteria including, but not limited to an associated risk of resource provider, authenticity of user credentials, a maximum recurrence value, etc.

Authorizing computer 450 may indicate the authorization result in an authorization response message. The authorization response message may comprise the transaction data, data associated with the account identifier and/or resource provider identifier, and the recurrence value.

In S411, authorizing computer 450 may send the authorization response message to transaction processing computer 440. In S412, transaction processing computer 440 may then send the authorization response message to transport computer 430, which may forward the authorization response message to resource provider computer 425 in S413. The authorization response message may comprise an indication of the determined recurrence value or frequency of interactions between user 410 and the resource provider, which may be used by the resource provider to determine an appropriate action. In one embodiment, the determined recurrence value may be communicated by transaction processing computer 440 to resource provider computer 425 in a recurrence API response message that is separate from the authorization response message in S412*a*. Resource provider computer 425 may then initiate an action based on the determined recurrence value received in the recurrence API response message in S414*a*.

In S414, resource provider computer 425 may receive the authorization response message and may determine an appropriate action based on the data contained therein. For example, resource provider computer 425 may receive an authorization response message containing a recurrence value of 'first time match—card has not been used at merchant in past 6 months,' and resource provider computer 425 may be configured with logic instructing the resource provider computer to print a coupon or prompt the resource provider to present user 410 with a gift. In another example, the resource provider may be a concert venue in which attendees are not allowed to leave and re-enter the venue more than twice during an event. When attempting to enter the venue, an attendee may present his or her credentials to a resource provider computer 425 for authorization (e.g. by scanning an RFID wristband, QR code, or barcode), and resource provider computer 425 may receive an authorization response message containing a recurrence value of 'frequent occurrence—user has been authorized more than two times today.' Resource provider computer 425 may then determine logic associated with the recurrence value, and the logic may initiate resource provider computer 425 to deny the attendee entrance despite the authenticity of the underlying credentials.

In S415, resource provider computer 425 may communicate the determined action to user 410. For example, resource provider computer 425 may receive an authorization result of 'decline—insufficient funds' and may prompt user 410 to present an alternate form of payment. In another example, resource provider computer 425 may be configured to generate a personalized welcome message if the recurrence value is equal to '0—first time match' and may display the message to user 410 in S415. In one embodiment, an action based on the recurrence value may be determined by transaction processing computer 440 and may be communicated to authorizing computer 450 after authorization has been completed in S416*a*. Authorizing computer 450 may then be configured to process the received action and interact with user 410 accordingly in S417*a*. For example, authorizing computer 450 may be an issuing bank that may receive a request to provide a $5 statement credit to user 410 in S416*a*. Authorizing computer may then process the request and may post the $5 statement credit to user 410's account in S417*a*.

FIG. 5 shows a depiction of a database according to one embodiment of the invention. Database 500 may be a relational database linking and storing data received in or determined from an interaction or transaction. The interaction may be, for example, a request for a recurrence value or a request to authorize access to a resource. According to an embodiment of the invention, each row in database 500 may correspond to a given transaction or interaction associated with data. The data may be organized into columns such as columns for a transaction ID 510, an account ID 520, a user name 530, a resource provider ID 540, a category code 550, a transaction amount 560, a transaction timestamp 570, and a recurrence count 580.

A transaction ID 510 may be a unique number and/or string of characters that identifies a specific transaction. For example, the transaction ID may be a 17-character string of numbers and letters such as '92929401 KDJFKSL29.' An account ID 520 or account identifier may be a number and/or string of characters identifying an account that may be used by a user to conduct transactions. For example, an account ID may be a 16—digit number such as '1305030300293583' identifying a financial account associated with an amount of credit or assets attributed to a specific individual. A user name 530 may be the name of a user associated with one or more accounts or account IDs. For example, a user name 'User 2' may be associated with an account ID of '0239-5902 . . . ' as well as an account ID of '21984901 . . . .'

A resource provider ID 540 or resource provider identifier may be a number and/or string of characters identifying a resource provider or resource provider computer at which a transaction was conducted. For example, a resource provider ID may be a merchant ID of '37242 . . . ' identifying a resource provider computer system of 'McDonald's: Burgers, Fries & More.' A category code 550 may be a number assigned to a group of resource providers that share common characteristics. For example, a category code may be a four digit number such as '5814,' which may be a merchant category code (MCC) identifying merchants that share the characteristic of 'Fast Food Restaurant.'

A transaction amount 560 may be an amount of funds of a given currency exchanged during a transaction. For example, a user 'User 1' may conduct a transaction associated with a transaction amount of $129,081, in which $129,081 were exchanged for landscaping services. A transaction timestamp 570 may be a sequence of characters or encoded information identifying when a certain interaction or transaction occurred. For example, a transaction timestamp may be a standardized combination of date and time associated with a transaction such as '2017-01-20 T 06:45 UTC.' A recurrence count 580 may be a count that is incremented each time a transaction between a specific account ID and a specific resource provider ID occurs. For example, a transaction identified as '90JHKL . . . ' may be the third transaction between account ID '23506023 . . . ' of user 'User 3' and resource provider ID '99935 . . . ' of 'Rays Electric' and may be associated with a recurrence count of '3.'

According to embodiments of the invention, a transaction processing computer, such as transaction processing computer 140 of FIG. 1, may add, update, and/or query entries in database 500 during a transaction. For example, data relating to a transaction conducted between user 'User 4' and resource provider identifier '37242 . . . McDonald's: Burgers, Fries & More' may be received in an authorization request message and the transaction processing computer may read, sort, record, and link the data in a new row of entries in database 500 (e.g. transaction amount=$10; transaction timestamp=2017-01-20 T 06:45 UTC). The transaction processing computer may determine a recurrence value for the transaction by querying database 500 for previous transactions containing linked to the account ID and resource provider ID and determining number of times the transactions occurred over a predetermined period of time (e.g. once per year). The transaction processing computer may then update an entry for the recurrence count of the transaction based on the determined value (e.g. recurrence count=1).

The determined recurrence value may later be retrieved by the transaction processing computer to determine an action or may be sent to another computer system which may determine its own action based on the recurrence value. According to one embodiment of the invention, the recurrence value may not be stored and retrieved from database 500, and may instead be dynamically calculated or determined during a transaction based on the entries of database 500. The determined recurrence value may then initiate an action according to predetermined logic. For example, user 'User 3' may use account '23506023 . . . ' to conduct transaction '90JHKL . . . ' with resource provider '99935 . . . -Rays Electric.' The transaction may represent a change order during a 6 month construction project, and the resource provider and the user may have reached a predetermined deal or contract in which the third change order is discounted at 10%. The predetermined contract may have been stored in the form of executable logic in a recurrence logic database such as recurrence logic database 344B of FIG. 3. Upon initiation of the transaction, the transaction processing computer may receive transaction data for the transaction in an authorization request message and may query database 500 for transactions linked to both account ID '23506023' and resource provider ID '99925.' The transaction processing computer may then calculate the frequency of transactions spanning over the 6 month time period and determine a recurrence value or interaction frequency of '3.' Upon calculating the recurrence value, the transaction processing computer may then execute the predetermined logic, which instructs its processor to reduce the transaction amount contained in the authorization request message by 10%, thus applying the terms of the predetermined contract.

In another embodiment, the transaction processing computer may determine a recurrence value based on the entries in database 500 and may send the recurrence value to a resource provider computer that is configured with locally stored logic to perform an action based on the recurrence value. For example, user 'User 2' may use account '21984901 . . . ' to conduct transaction '9890HOY8 . . . ' with resource provider '37242 . . . -Memorial Hermann Hospital.' The account ID may be a health insurance policy number, and the transaction may be a billing of healthcare services. Transaction data for the transaction may be received by a transaction processing computer in an authorization request message generated by a resource provider computer. The transaction processing computer may determine a recurrence value for the transaction based on the entries of database 500 and may determine that the recurrence value is equal to '2' or 'two times within last 6 months.' The transaction processing computer may send the determined recurrence value to the resource provider computer in an authorization response message. The resource provider computer may then receive the recurrence value and may execute predetermined logic that instructs the resource provider computer to compare the recurrence value to the account holder's medical records. The predetermined logic may further instruct the resource provider computer to alert the account issuer (i.e. health insurance provider) of possible fraud if the recurrence value does not match expected results (e.g. 'no record of patient receiving care within last 6 months—flag as fraudulent').

Embodiments of the invention provide a number of technical advantages over prior art. Embodiments of the invention may allow for the tracking of user behavior across disparate computer systems. According to embodiments of the invention, recurrence may be calculated by a central server computer and may be communicated along already existing channels of authorization or through preconfigured API messages. Furthermore, embodiments of the invention may eliminate the need for users to carry around multiple access cards, loyalty cards, reward cards, etc. as a transaction processing computer can determine the recurrence of transactions between a given resource provider and the user. In addition, embodiments of the invention may absolve resource providers from maintaining their own dedicated accounts, databases, and servers for tracking user interactions, and may allow resource provider computers to generate automated custom responses based on predetermined recurrence logic.

FIG. 6 shows an example of an implementation of recurrence API messages according to an embodiment of the invention. According to FIG. 6, a user or cardholder 610 wishes to make a purchase at a resource provider such as a merchant 625. The cardholder 610 may present his or her portable device storing user credentials. The portable device may be a payment card storing an account identifier such as a PAN. The merchant 625 may ask the user to transmit the stored account identifier to a resource provider computer of the merchant 625. According to one embodiment, the resource provider computer may include a card reader, and the cardholder may transmit the stored account identifier by swiping, inserting, or wirelessly transmitting the account identifier from the portable device to the card reader.

The resource provider computer may generate a user recurrence API request message or customer recurrence API request message comprising the account identifier and a resource provider identifier of the resource provider. The resource provider identifier may be a merchant ID, MCC, or card acceptor ID that identifies the resource provider computer or systems associated with it. The resource provider computer may then transmit the user recurrence API request message to a transaction processing server computer 640. The transaction processing server computer 640 may be a server computer of a transaction processing network, such as VisaNet, and the resource provider computer may transmit the user recurrence API request message to the transaction processing server computer 640 over a network, such as the internet.

The transaction processing server computer 640 may receive the user recurrence API request message and may determine a user recurrence value or customer recurrence value based on at least the account identifier and resource provider identifier. For example, the transaction processing server computer 640 may query a relational database for transactions that are linked to both the account identifier and the resource provider identifier and may calculate a frequency of occurrence for the transactions by determining how many of the transactions occurred over a predetermined period of time (e.g. 1 week, 1 month, 3 months, 6 months, 1 year, etc.). The transaction processing server computer 640 may then determine a discrete value that is associated with the frequency of occurrence and is recognizable by the resource provider computer. The discrete value may be a predetermined value or the modification of a predetermined bit, in which the predetermined value or modified bit may be identified by the resource provider computer as being associated with a specific frequency of occurrence or range of frequencies (e.g. 'bit 3=1: cardholder/merchant ID match occurs one or more times in the past week).

The transaction processing server computer 640 may then generate a user recurrence API response message comprising the determined user recurrence value and may send the user recurrence API response message to the resource provider computer. The resource provider computer may receive the user recurrence API response message, and may read the user recurrence value contained therein. The resource provider computer may then perform an initiated action based on the read user recurrence value. For example, the resource provider computer may be configured with logic that initiates the display of instructions for interacting with a user when a user recurrence API response message is received. The instructions may be, for example, instructions to give the user a gift or coupon (e.g. 'user is a first time customer—give user a free cookie." According to embodiments of the invention, the initiated action may be any given action that is performed upon execution of preconfigured logic associated with a given user recurrence value.

FIG. 7 shows an example of an implementation of authorization messages according to an embodiment of the invention. According to FIG. 7, a user or cardholder 710 wishes to interact or conduct a transaction with a resource provider such as a merchant 725. The cardholder 710 presents his or her portable device storing user credentials. The portable device may be a payment card storing an account identifier such as a PAN. The merchant 725 may ask the user to transmit the stored account identifier to a resource provider computer of the merchant 725. The resource provider computer may be, for example, a portable computing device such as a tablet or phone. In one embodiment, the resource provider computer may include a card reader, and the cardholder 710 may transmit the stored account identifier by swiping, inserting, or transmitting the account identifier from the portable device to the card reader.

The resource provider computer may generate an authorization request message. The authorization request message may comprise a transaction amount, the account identifier, and a resource provider identifier of the resource provider. The authorization request message may further comprise an indication of a request for a user recurrence value or customer recurrence value for a specific user and a specific resource provider or specific category of resource providers. For example, the authorization request message may comprise an allocated bit, in which a request for a user recurrence value for the user and the resource provider computer is indicated if the value of the bit is '1' or 'true.' The resource provider computer may then send the authorization request message to a transaction processing server computer 740 so that the transaction may be processed for authorization.

The transaction processing server computer 740 may receive the authorization request message and may determine that the authorization request message contains an indication of a request for a user recurrence value. The transaction processing server computer 740 may then determine the user recurrence value based on at least the account identifier and resource provider identifier. For example, the transaction processing server computer 740 may query a relational database for transactions linked to the account identifier and the resource provider identifier received in the authorization request message and may calculate how many of those transactions occurred over a predetermined period of time (e.g. previous month, 3 months, 6 moths, previous year, etc.). The transaction processing server computer 740 may then store the determined user recurrence value in an allocated data field of the authorization message prior to or after authorization. For example, the transaction processing server computer 740 may send the authorization request message to an authorizing computer, which may return an authorization response message to the transaction processing computer. The transaction processing server computer 740 may receive the authorization response message and may store the user recurrence value in a data field of the authorization response message specifically dedicated for user recurrence values (e.g. 'Field 104—user recurrence'). According to one embodiment, the presence of the allocated data field may be indicated by another data field of the authorization message, such as a standardized bitmap that is present in all authorization messages configured according to embodiments of the invention.

The transaction processing server computer 740 may then send the authorization response message comprising the user recurrence value to the resource provider computer so that an action based on the user recurrence value may be initiated. The resource provider computer may receive the user recurrence value, and may execute predetermined logic associated with the received user recurrence value. For example, the resource provider computer may be configured with logic, in which a user recurrence value equal to '0' initiates the resource provider computer to display a welcome message to the user. Any number of actions may be performed by the resource provider computer based on the received user recurrence value such as an application of a discount, a printing of a coupon, a display of instructions or messages, etc.

Figure 8:
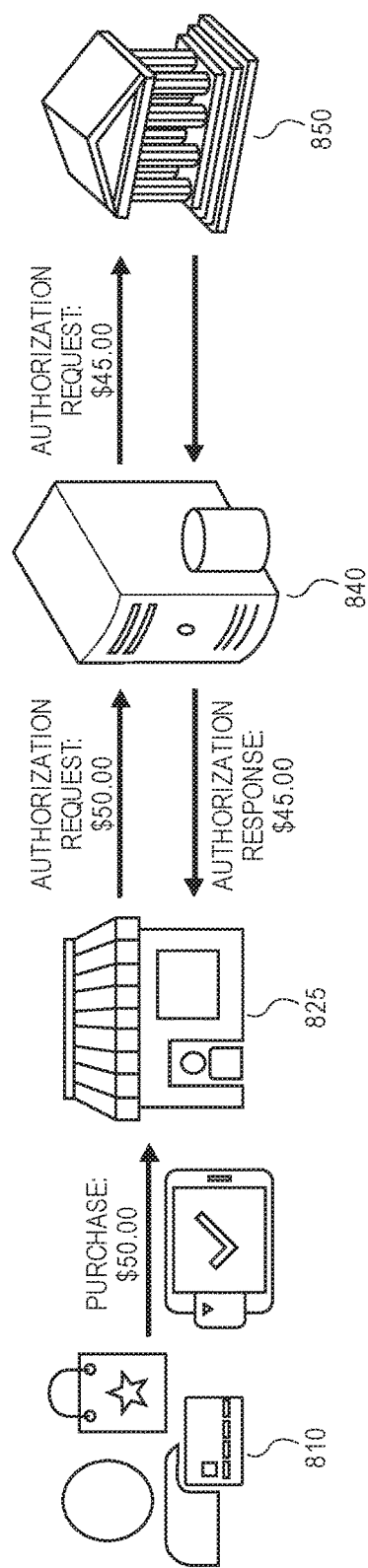
FIG. 8 shows an example of a use case according to an embodiment of the invention.

FIG. 8 shows an example of a use case according to an embodiment of the invention. Specifically, FIG. 8 depicts a transaction processing server computer 840 determining a user recurrence value and dynamically reducing an authorization amount during a transaction. According to FIG. 8, a user or cardholder 810 attempts to make a $50 purchase at a resource provider. The resource provider may be a merchant 825 such as a restaurant. The resource provider receives user credentials or an account identifier of the user to initiate the transaction. For example, the cardholder 810 may swipe a credit card comprising a PAN into a card reader of the resource provider's computer. The resource provider may then generate an authorization request message comprising the transaction amount, the account identifier of the user, and a resource provider identifier and may send the authorization request message to a transaction processing computer.

The transaction processing server computer 840 may receive the authorization request message and may recognize the participant card and merchant 825 from the account identifier and resource provider identifier. The transaction processing server computer 840 may then determine a user recurrence value, which may indicate that the user has never interacted with the merchant 825 or the resource provider computer. The transaction processing server computer 840 may then execute predetermined logic in which the transaction processing server computer 840 is instructed to dynamically reduce the authorization amount if the user has never interacted with the resource provider computer before. The transaction processing server computer 840 may then reduce the transaction amount of $50 to $45 before determining an authorizing entity or authorizing entity computer and sending the authorization request message to the authorizing entity.

The authorizing entity may be an issuer 850 that determines an authorization result based on at least the account identifier and the transaction amount. For example, the issuer 850 may be a bank that may query a database for a bank account identified by the account identifier and determine if the account comprises a balance that is greater than the transaction amount of $45. The authorizing entity or authorizing entity computer may then generate an authorization response message comprising the authorization result and may send the authorization response message to the transaction processing server computer 840.

The transaction processing server computer 840 may receive the authorization response message and may forward the authorization response message to the resource provider, which may receive the authorization response message and may finalize the transaction with the user based on the authorization result contained therein. For example, the resource provider may print a receipt or confirmation of authorization and may present the receipt to the user so that he or she may sign and confirm the transaction and/or add gratuity.

Figure 9:
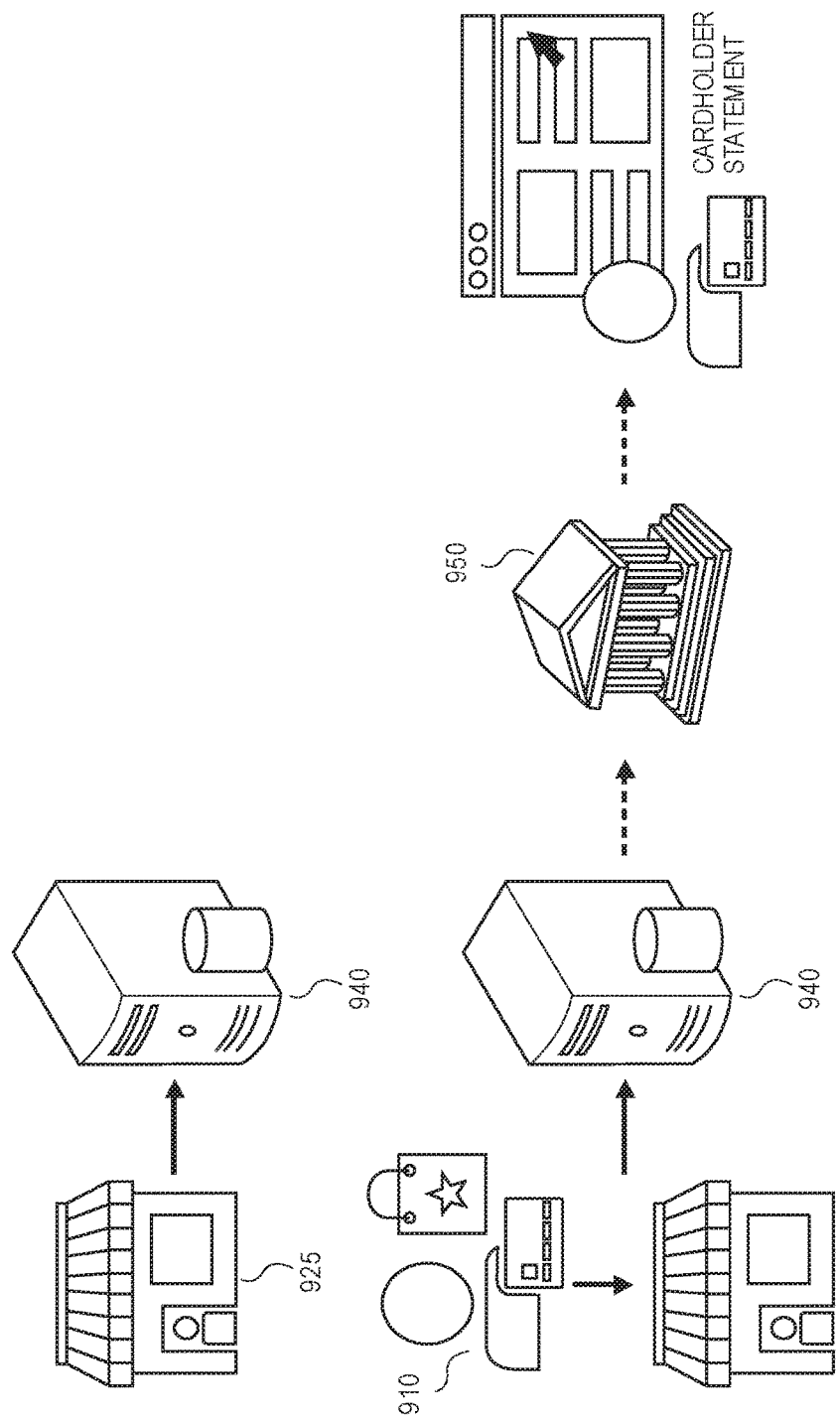
FIG. 9 shows an example of another use case according to another embodiment of the invention.

FIG. 9 shows an example of another use case according to another embodiment of the invention. Specifically, FIG. 9 depicts an authorizing entity or issuer 950 posting a statement credit to a user or cardholder 910 based on a determined recurrence value. According to FIG. 9, a merchant 925 may enroll or establish predetermined rules with transaction processing server computer 940. For example, the merchant 925 may "opt-in" to a loyalty program or loyalty platform, in which various loyalty conditions associated with interactions between the merchant 925 and cardholder 910 are established.

The loyalty conditions may be stored in a database in the form of logic, in which various recurrence values are linked to one or more actions to be initiated by a transaction processing server computer 940. For example, a loyalty condition may state that a cardholder may receive a $5 statement credit if they interact with the merchant 925 at least twice a week. After a transaction between the cardholder 910 and the merchant 925 has been authorized, the transaction processing server computer 940 may determine a recurrence value based on an account identifier and resource provider associated with the transaction. The transaction processing server computer 940 may then determine, based on the determined recurrence value, an action to be initiated. The action may be an action that is to be performed by an authorizing entity computer or by the issuer 950.

The transaction processing server computer 940 may then generate a message requesting the authorizing entity computer to perform the determined action. For example, the action initiated based on the recurrence value may be for the issuer 950 to post a $5 statement credit to the cardholder 910's account. The transaction processing server computer 940 may then generate a message requesting the issuer 950 or authorizing entity computer to perform the action, and may send the message to the authorizing entity computer. The authorizing entity computer or issuer 950 may receive the message and process the requested action contained therein. The authorizing entity computer or issuer 950 may then perform the action and inform the user or cardholder 950 that the action has been performed. For example, the issuer 950 may allocate $5 to cardholder 910's account, and may later generate a monthly billing statement in which one of the interactions listed in the monthly billing statement is a $5 credit labeled as 'New Customer Bonus for Merchant.'

Embodiments of the invention may include additional use cases. A first use case can occur where a resource provider receives a recurrence value from a transaction processing computer and provides a user with an immediate reward such as a free dessert. A second use case can occur where a resource provider receives a recurrence value and provides the user with a future reward such as a coupon for 50% off the next purchase. A third use case can occur when a resource provider receives a recurrence value and prints out a welcome message for the user. A fourth use case ca occur where a participating resource provider receives a recurrence value and initiates a participating authorizing entity to send a user an offer to sign up for a co-branded issued product or card.

Specific details regarding some of the above-described aspects are provided above. The specific details of the specific aspects may be combined in any suitable manner without departing from the spirit and scope of embodiments of the invention.

It should be understood that the present invention as described above can be implemented in the form of control logic using computer software (stored in a tangible physical medium) in a modular or integrated manner. Based on the disclosure and teachings provided herein, a person of ordinary skill in the art will know and appreciate other ways and/or methods to implement the present invention using hardware and a combination of hardware and software.

Any of the software components or functions described in this application, may be implemented as software code to be executed by a processor using any suitable computer language such as, for example, Java, C++ or Perl using, for example, conventional or object-oriented techniques. The software code may be stored as a series of instructions, or commands on a computer readable medium, such as a random access memory (RAM), a read only memory (ROM), a magnetic medium such as a hard-drive or a floppy disk, or an optical medium such as a CD-ROM. Any such computer readable medium may reside on or within a single computational apparatus, and may be present on or within different computational apparatuses.

The above description is illustrative and is not restrictive. Many variations of the invention will become apparent to those skilled in the art upon review of the disclosure. The scope of the invention should, therefore, be determined not with reference to the above description, but instead should be determined with reference to the pending claims along with their full scope or equivalents.

One or more features from any embodiment may be combined with one or more features of any other embodiment without departing from the scope of the invention.

A recitation of "a", "an" or "the" is intended to mean "one or more" unless specifically indicated to the contrary.

All patents, patent applications, publications, and descriptions mentioned above are herein incorporated by reference in their entirety for all purposes. None is admitted to be prior art.

What is claimed is:

1. A method comprising:
   a) processing, by a transaction processing computer, a plurality of transactions, wherein each transaction is conducted between a user and a resource provider computer and includes (i) receiving an authorization request message, (ii) determining an authorization entity computer associated with the user, (iii) transmitting the authorization request message to the authorizing entity computer, (iv) receiving an authorization response message from the authorizing entity computer, and (v) transmitting the authorization response message to the resource provider computer;
   b) storing, in a database by the transaction processing computer, (i) an account identifier of the user and (ii) a resource provider identifier of the resource provider computer that are both linked to the plurality of transactions;
   c) determining, by the transaction processing computer, a recurrence value based on (i) querying the database for transactions that are linked to both the account identifier and the resource provider identifier and (ii) calculating a number or frequency, over a predetermined period of time, of the transactions that are linked to both the account identifier and the resource provider identifier, the recurrence value indicating at least a frequency or number of interactions between the resource provider computer and the user; and
   d) initiating, by the transaction processing computer, an action based on the recurrence value.

2. The method of claim 1, wherein the action initiated based on the recurrence value comprises modifying data in an authorization request message during a transaction.

3. The method of claim 1, wherein the recurrence value is:
a discrete value associated with the frequency at which the transactions occurred.

4. The method of claim 1 further comprising:
receiving, by the transaction processing computer, from the resource provider computer, a request for a recurrence value associated with a specific user and a specific resource provider or a specific category of resource providers;
determining, by the transaction processing computer, the requested recurrence value; and
sending, by the transaction processing computer, to the resource provider computer, the requested recurrence value.

5. The method of claim 4, wherein the request for the recurrence value is received in an API request message that is independent from an authorization request message, and wherein the recurrence value is sent to the resource provider computer in an API response message that is independent from an authorization response message.

6. The method of claim 4, wherein the request for the recurrence value is indicated in an authorization request message, and wherein the recurrence value is sent to the resource provider computer in an authorization response message during a transaction.

7. The method of claim 4, wherein the resource provider computer performs the initiated action by executing predetermined logic.

8. The method of claim 7, wherein the initiated action comprises displaying instructions for interacting with the user.

9. A server computer comprising:
a processor;
a network interface; and
a non-transitory computer-readable medium comprising code instructing the processor to implement a method, the method comprising:
   a) processing a plurality of transactions, wherein each transaction is conducted between a user and a resource provider computer and includes (i) receiving an authorization request message, (ii) determining an authorization entity computer associated with the user, (iii) transmitting the authorization request message to the authorizing entity computer, (iv) receiving an authorization response message from the authorizing entity computer, and (v) transmitting the authorization response message to the resource provider computer;
   b) storing, in a database, (i) an account identifier of the user and (ii) a resource provider identifier of the resource provider computer that are both linked to the plurality of transactions;
   c) determining a recurrence value based on (i) querying the database for transactions that are linked to both the account identifier and the resource provider identifier and (ii) calculating a number or frequency, over a predetermined period of time, of the transactions that are linked to both the account identifier and the resource provider identifier, the recurrence value indicating at least a frequency or number of interactions between the resource provider computer and the user; and
   d) initiating an action based upon the recurrence value.

10. The server computer of claim 9, wherein the action initiated based on the recurrence value comprises modifying data in the authorization request message.

11. The server computer of claim 9, wherein the recurrence value is:
a discrete value associated with the frequency at which the transactions occurred.

12. The server computer of claim 9, wherein the method further comprises:
- receiving from the resource provider computer, a request for a recurrence value associated with a specific user and a specific resource provider or a specific category of resource providers;
- determining the requested recurrence value; and
- sending to the resource provider computer, the requested recurrence value.

13. The server computer of claim 12, wherein the request for the recurrence value is received in an API message that is independent from an authorization request message, and wherein the recurrence value is sent to the resource provider computer in an API message that is independent from an authorization response message.

14. The server computer of claim 12, wherein the request for the recurrence value is indicated in an authorization request message, and wherein the recurrence value is sent to the resource provider computer in an authorization response message during a transaction.

15. The server computer of claim 14, wherein the method further comprises:
- generating a message requesting the authorizing entity computer to perform the action initiated based on the recurrence value; and
- sending to the authorizing entity computer, the message after the transaction has been authorized, wherein the authorizing entity computer receives the message, performs the action, and informs the user that the action has been performed.

* * * * *